United States Patent [19]

Sanchez

[11] Patent Number: 5,791,610
[45] Date of Patent: Aug. 11, 1998

[54] QUICK RELEASE BOW RACK

[76] Inventor: Freddy D. Sanchez, Box 3563, Boles Acres, Alamogordo, N. Mex. 88311

[21] Appl. No.: 845,360

[22] Filed: Apr. 24, 1997

Related U.S. Application Data

[60] Provisional application No. 60/002,411 Jul. 30, 1996.

[51] Int. Cl.⁶ .................................................. F16M 11/00
[52] U.S. Cl. ................................... 248/176.1; 224/916
[58] Field of Search .............................. 248/176.1, 201, 248/230.1, 230.5, 298.1, 316.1, 316.5, 429; 211/13.1, 64, 175; 124/1, 86, 23.1

[56] References Cited

U.S. PATENT DOCUMENTS

| | | | |
|---|---|---|---|
| 1,175,849 | 3/1916 | Warren | 248/230.1 |
| 2,316,995 | 4/1943 | Smith . | |
| 2,332,409 | 10/1943 | Stevens | 248/316.1 |
| 2,632,619 | 3/1953 | Wilson . | |
| 3,473,673 | 10/1969 | Porter | 248/201 |
| 3,627,253 | 12/1971 | Hericourt et al. | 248/429 |
| 4,057,183 | 11/1977 | Ness . | |
| 4,364,499 | 12/1982 | McCue . | |
| 4,469,257 | 9/1984 | Parker . | |
| 4,529,158 | 7/1985 | Sautter, Jr. | 248/429 |
| 4,957,229 | 9/1990 | Freeman . | |
| 5,044,584 | 9/1991 | Lin | 248/230.1 |
| 5,249,722 | 10/1993 | Horn . | |
| 5,360,190 | 11/1994 | Walker et al. . | |
| 5,385,280 | 1/1995 | Littlepage et al. . | |
| 5,425,522 | 6/1995 | Retzlaff | 248/429 |
| 5,482,241 | 1/1996 | Oglesby . | |

FOREIGN PATENT DOCUMENTS

| | | |
|---|---|---|
| 2738460 | 3/1979 | Germany . |

*Primary Examiner*—Leslie A. Braun
*Assistant Examiner*—Robert Lipcsik
*Attorney, Agent, or Firm*—Richard C. Litman

[57] ABSTRACT

A quick release bow rack for securing an archery bow on or within a vehicle. The bow rack includes an elongated supporting member which supports two clamps in a spaced relationship. The clamps hold the limbs of archery bow, and are spring biased toward the open position. Each clamp is held in the closed position by a latch which is pivotally attached to one of the jaws of the clamp and is capable of engaging the other jaw of the clamp. Each latch is connected to a cable which disengages the respective latch from one of the jaws of the respective clamp, when the cable is pulled. The cables connected to the latches are connected to a single pivoting lever such that pulling on the lever causes both cables to be pulled, thus allowing both clamps to spring open and allowing a bow held in the rack to be quickly removed. The present invention also includes a variety of mounting adapters for mounting the bow rack of the present invention to a variety of vehicles.

13 Claims, 10 Drawing Sheets

QUICK RELEASE BOW RACK

CROSS-REFERENCE TO RELATED APPLICATION

This application claims the benefit of U.S. Provisional patent application Ser. No. 60/022,411, filed Jul. 30, 1996.

BACKGROUND OF THE INVENTION

1. Field of the Invention

The present invention relates to a quick release bow rack for holding an archery bow and allowing for the quick removal of the bow from the rack.

2. Description of the Relate Art

Hunting bows have evolved into very sophisticated and expensive pieces of equipment. Hunters most often travel to the hunting fields in a vehicle such as an all terrain vehicle, a four-wheel drive truck, or a four-wheel drive sport utility vehicle. Obviously, hunters have to carry their bows in these vehicles which are often driven long distances over rough terrain. When driving over rough terrain, the hunter's bow can get knocked around causing the bow to become damaged or the sights to be thrown out of proper alignment. The aforementioned damage and sight misalignment can occur even when the bow is enclosed in a protective case. Damage to the bow represents a significant economic loss to the bow hunter. In addition, damage to the bow or misalignment of the sight can ruin a hunting trip by foreclosing the possibility of bagging any game.

Therefore it is highly desirable to securely immobilize the bow within the vehicle while driving. The present invention is a bow rack which securely immobilizes a bow within a vehicle, while allowing for quick release of the bow. The present invention also includes a variety of mounting adapters for mounting the bow rack of the present invention to a variety of vehicles. Racks which immobilize a bow within or on a vehicle have been proposed in the past. However, none of these bow racks show the unique quick release mechanism or the unique variety of mounting adapters of the present invention.

U.S. Pat. No. 2,316,995, issued to Arvid Smith on Apr. 20, 1943, shows a gun rack mounted between the dash and floor board of a vehicle. The Smith gun rack uses a single spring loaded clamp to hold the gun in place. The clamp of Smith is biased toward the closed position, and the clamp must be held open to remove the gun. Smith does not show two clamps, biased toward the open position, that are simultaneously releasable using a single lever. Further, Smith does not show the various mounting adapters of the present invention.

U.S. Pat. No. 2,632,619, issued to Arthur Reed Wilson on Mar. 24, 1953, shows a gun rack mounted to the roof of a vehicle. The Wilson gun rack uses a single clamp to hold the gun in place. The clamp of Wilson is moved between the open and closed positions by a lever operated cam. Wilson does not show two clamps that are simultaneously releasable using a single lever. Further, Wilson does not show the various mounting adapters of the present invention.

U.S. Pat. No. 4,057,183, issued to Philip J. Ness on Nov. 8, 1977, shows a gun rack that mounts to the wheel well of a pickup truck. Ness does not show two clamps that are simultaneously releasable using a single lever. Further, Ness does not show the various mounting adapters of the present invention.

U.S. Pat. No. 4,364,499, issued to Maurice H. McCue on Dec. 21, 1982, shows a gun rack that mounts to the floor of a vehicle. The gun rack of McCue uses a single locking clamp to secure the gun in place. McCue does not show two clamps that are simultaneously releasable using a single lever. Further, McCue does not show the various mounting adapters of the present invention.

U.S. Pat. No. 4,469,257, issued to Barry R. Parker on Sep. 4, 1984, shows a ski rack that mounts to the bed of a pickup truck. Parker does not show two clamps that are simultaneously releasable using a single lever. Further, Parker does not show the various mounting adapters of the present invention.

U.S. Pat. No. 4,957,229, issued to Lowell J. D. Freeman on Sep. 18, 1990, shows a bow rack that mounts to the side wall of the bed of a pickup truck. The bow rack of Freeman uses tension in the bowstring to secure the bow to the rack. Freeman does not show two clamps that are simultaneously releasable using a single lever. Further, Freeman does not show the various mounting adapters of the present invention.

U.S. Pat. No. 5,249,722, issued to Dennis L. Horn on Oct. 5, 1993, shows a bow rack that mounts to the side wall of the bed of a pickup truck. The bow rack of Horn uses a pair of hook-like members to cradle the bow and a spring loaded clip to hold the bow stabilizer. Horn does not show two clamps that are simultaneously releasable using a single lever. Further, Horn does not show the various mounting adapters of the present invention.

U.S. Pat. No. 5,360,190, issued to James C. Walker et al. on Nov. 1, 1994, shows an archery bow holder that includes two pairs of resilient jaws which grip the bow. Each pair of jaws has a base which mounts to the hood of a vehicle. Walker et al. does not show two clamps that are simultaneously releasable using a single lever. Further, Walker et al. does not show the various mounting adapters of the present invention.

U.S. Pat. No. 5,385,280, issued to Mike Littlepage et al. on Jan. 31, 1995, shows a bicycle rack mounted to a vehicle. The bicycle rack of Littlepage et al. uses spring loaded clamps to grip the frame of a bicycle. Littlepage et al. does not show two clamps, biased toward the open position, that are simultaneously releasable using a single lever. Further, Littlepage et al. does not show the various mounting adapters of the present invention.

U.S. Pat. No. 5,482,241, issued to Harvey D. Oglesby on Jan. 9, 1996, shows a bow support that attaches to a tree. Oglesby does not show two clamps that are simultaneously releasable using a single lever. Further, Oglesby does not show the various mounting adapters of the present invention.

German Patent Document Number 2,738,460, by Helmut Quint dated Mar. 1, 1979, shows a stand for the safe storage of a bow. Quint does not show two clamps that are simultaneously releasable using a single lever. Further, Quint does not show the various mounting adapters of the present invention.

None of the above inventions and patents, taken either singly or in combination, is seen to describe the instant invention as claimed.

SUMMARY OF THE INVENTION

The present invention is directed to a bow rack which securely immobilizes a bow within a vehicle, while allowing for quick release of the bow. The bow rack of the present invention includes an elongated supporting member which supports two clamps in a properly spaced relationship, such that the clamps can support the limbs of an archery bow. The clamps are spring biased toward the open position, and each clamp is held in the closed position by a latch which is pivotally attached to one of the jaws of the clamp and is capable of engaging the other jaw of the clamp. Each latch is connected to a cable which disengages the respective latch from one of the jaws of the respective clamp, when the cable is pulled. The cables connected to the latches are connected to a single pivoting lever such that pulling on the lever causes both cables to be pulled, thus allowing both clamps to spring open and allowing a bow held in the rack to be quickly removed. The present invention also includes a variety of mounting adapters for mounting the bow rack of the present invention to a variety of vehicles.

Accordingly, it is a principal object of the invention to provide a rack for immobilizing an archery bow carried in a vehicle.

It is another object of the invention to provide an archery bow rack with the rack having a quick release feature.

It is a further object of the invention to provide an archery bow rack which can be mounted to a variety of vehicles.

Still another object of the invention is to provide a rack which can hold archery bows of a variety of types and sizes, without interfering with any attachments to the bow such as sights, quivers holding arrows, arrow rests, etc.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Referring to FIGS. 1–4, the present invention is a bow rack which securely immobilizes an archery bow 12 on or within a vehicle, while allowing for quick release of the bow. The bow rack 10 includes an elongated supporting member 14 which supports two clamp assemblies 16 in a spaced relationship. Each clamp assembly 16 includes a clamp 18 which is attached by a stem 20 to a collar 22.

Figure 1:
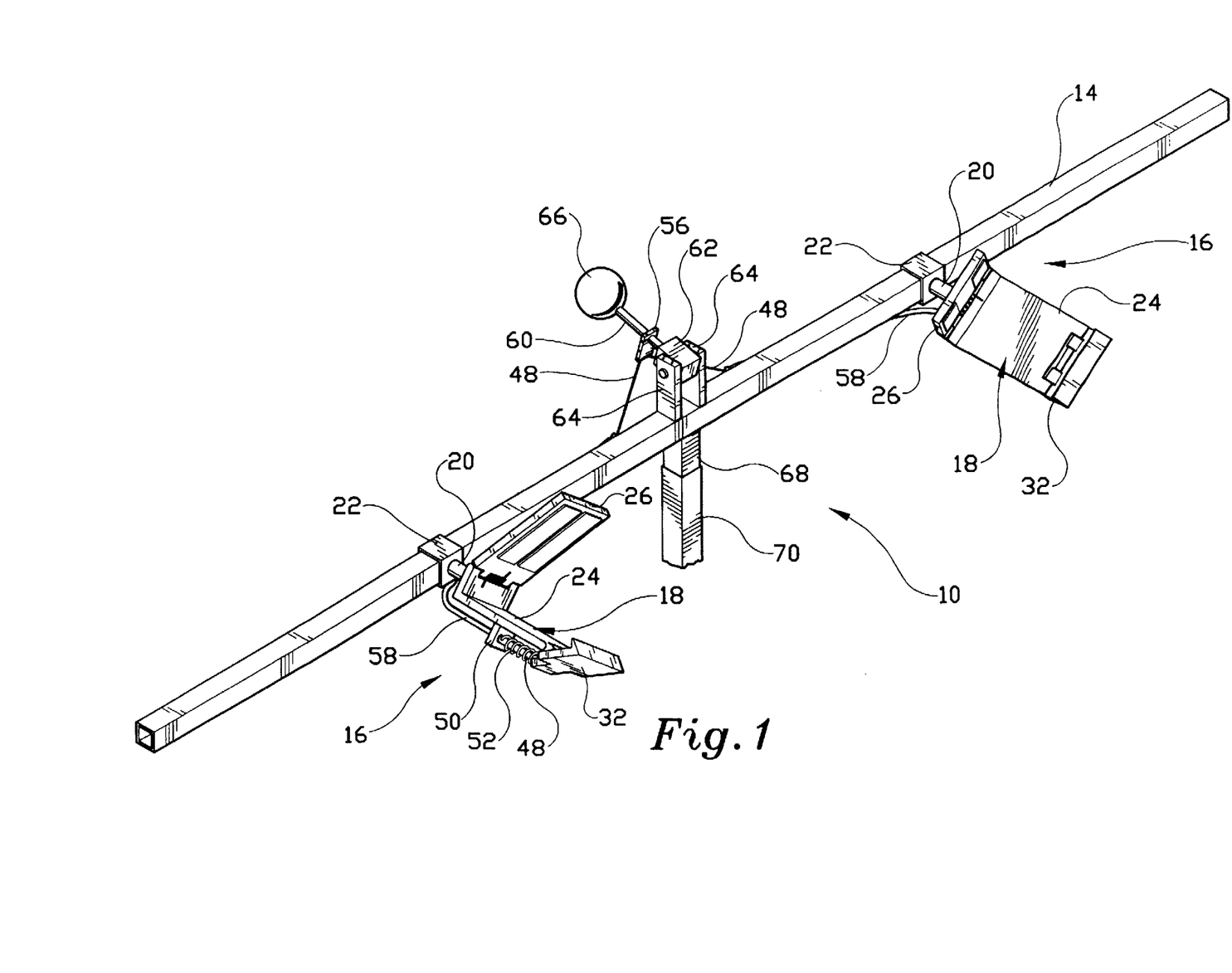
FIG. 1 is a front perspective view of the quick release bow rack of the present invention.
Figure 2:
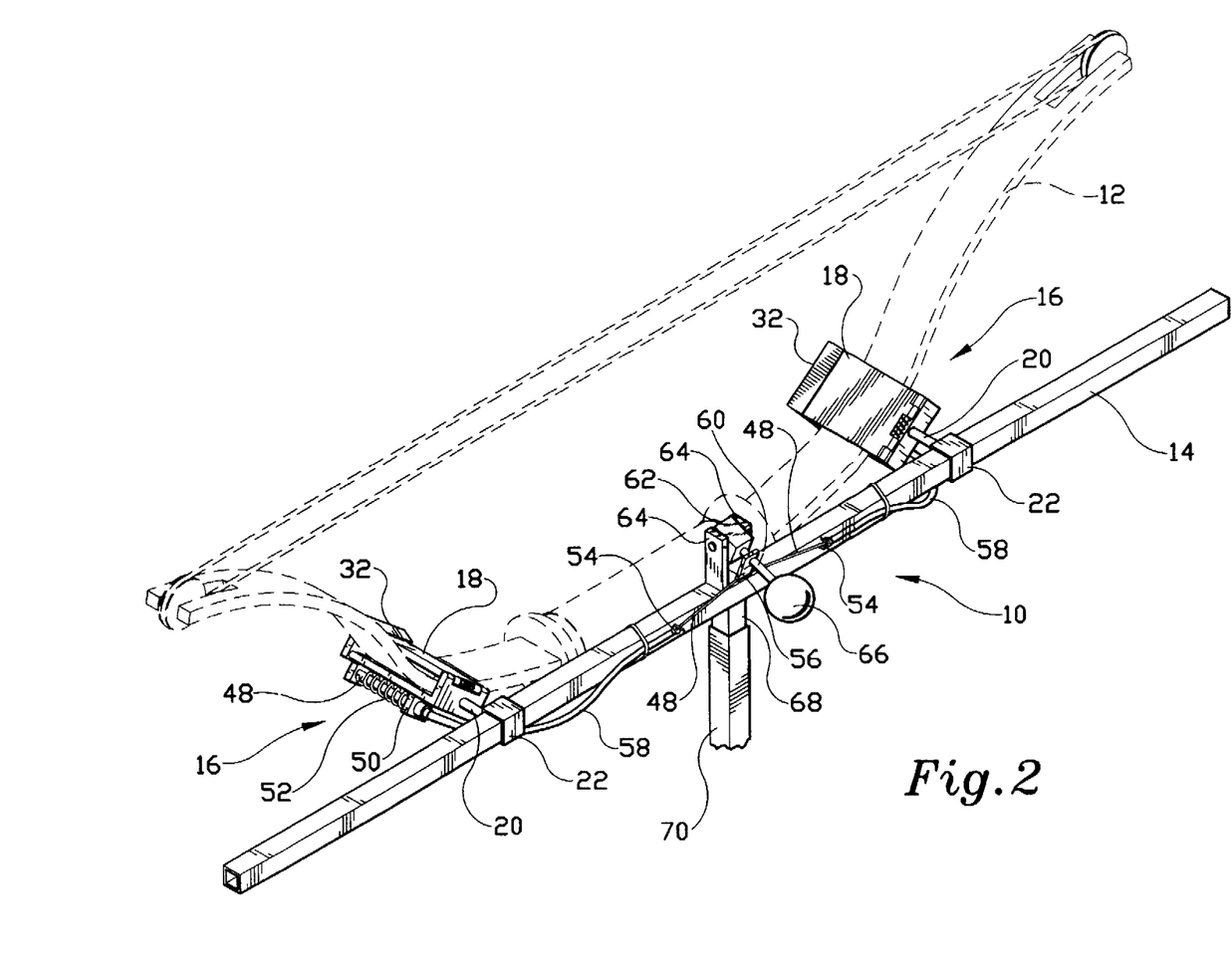
FIG. 2 is an environmental, rear perspective view of the quick release bow rack of the present invention.

The elongated supporting member 14 is made from square-cross section metal or plastic tubing, the ends of which can be plugged by plastic safety plugs if desired. The collars 22 are shaped and dimensioned to slidably fit around the supporting member 14. This feature allows the collars 22, and thus the clamps 18, to be positioned at any desired location along the supporting member 14. Alternatively, the elongated support member 14 and the collars 22 may have mating cross-sectional shapes including, but not limited to, round, oval, and triangular, just to name a few.

The clamps 18 are intended to hold the limbs of the archery bow 12. By providing for the clamps to be slidably movable along the length of the supporting member 14, the distance between the clamps 18 can be adjusted to accommodate any size bow. Once the clamps 18 are moved to the desired locations, the collars 22 and thus the clamps 18 are securely held at the desired locations along the supporting member 14 by bolts or thumb screws 150 (shown in FIG. 12) which engage threaded holes 152 in the collars 22 and which frictionally engage the supporting member 14 when tightened.

The stems 20 are elongated pieces of metal that are welded or otherwise fixedly attached to the collars 22. The clamps 18 can be attached to the stems 20 in many ways, some examples of which are discussed below. For now, it suffices to state that the clamps 18 are angled oppositely to one another, such that each clamp 18 can cradle a respective limb of an archery bow. In other words, if for example one of the clamps 18 is tilted thirty degrees from the horizontal in the clockwise direction, then the other clamp 18 will be tilted thirty degrees from the horizontal in the counter clockwise direction. For each clamp 18, the axis of rotation for measuring the tilt angle referred to above is the longitudinal axis of the respective stem 20.

Figure 3:
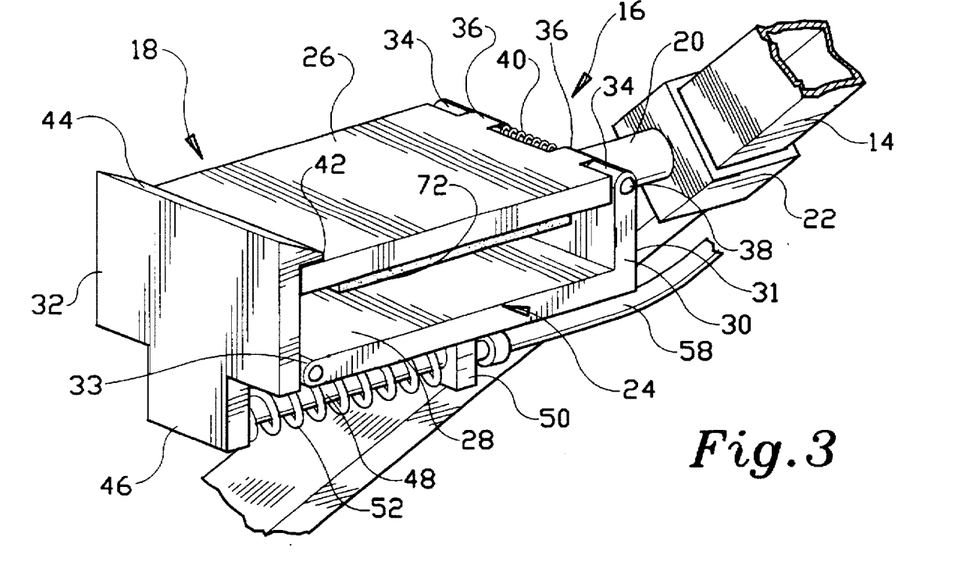
FIG. 3 is a fragmentary detail view showing one of the clamps used in the quick release bow rack of the present invention to hold the limbs of an archery bow, with the clamp being shown in the closed position.
Figure 4:
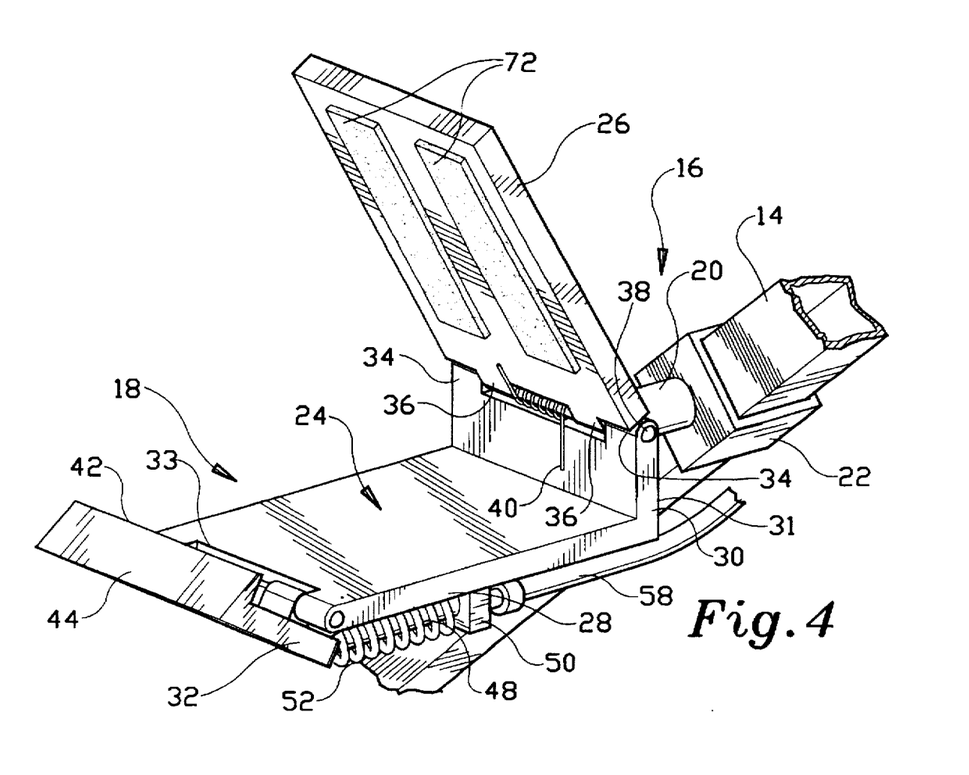
FIG. 4 is a fragmentary detail view showing one of the clamps used in the quick release bow rack of the present invention to hold the limbs of an archery bow, with the clamp being shown in the open position.

Referring to FIGS. 3 and 4 a representative clamp 18 can be seen in detail. Each clamp 18 has two jaws 24 and 26. The jaw 24 is formed by two rectangular, flat plates 28 and 30. The plate 30 projects perpendicularly from a first edge of the plate 28 to form a first end 31 of jaw 24. At a distal second end 33 of jaw 24 is a second edge of the plate 28, distal from the plate 30, that hingedly supports a latch 32. The edge of the plate 30, distal from the plate 28, has two projections 34. The jaw 26 is in the form of a flat, rectangular plate having two projections 36 at a first edge thereof. The projections 36 fit between the projections 34, and a hinge pin 38 passes through all the projections 34 and 36 to hingedly secure jaw 26 to jaw 24. A torsion spring 40 surrounds the hinge pin 38 and is located between the projections 36. The torsion spring 40 biases the jaws 24 and 26 toward the open position.

The latch 32 can pivot between an open position, illustrated in FIG. 4, and a closed position, illustrated in FIG. 3. Along the edge of the latch 32 distal from the pivot axis of the latch, is a ridge 42 extending perpendicularly from the inner surface of the latch 32. The outer surface 44 of the ridge 42 is beveled. The latch 32 also has an extension 46 which extends from the edge of the latch 32 proximate the pivot axis of the latch. Attached to the extension 46 is a cable 48. Projecting from the bottom of the jaw 24 is a rectangular fin-like projection 50. The fin-like projection 50 has a centrally located through hole therein. The cable 48 extends between the extension 46 and the fin-like projection 50 along the bottom of the jaw 24, and passes through the hole in the fin-like projection 50.

It should be readily apparent from the structure described above, that pulling on the cable 48 would tend to move the extension 46 toward the fin-like projection 50, thus tending to move the latch 32 from the closed to the open position. A coil spring 52 is positioned between the extension 46 and the fin-like projection 50, and surrounds the cable 48. The coil spring 52 biases the latch 32 toward the closed position such that, in the absence of a pulling force on the cable 48, the latch 32 will tend to pivot toward the closed position.

It should be apparent that there are two cables 48, one for each of the clamps 18. The cables 48 may be separate or they may be formed from a single continuous piece of cable. Referring again to FIG. 2, the cables 48 are routed, after passing through, behind the supporting member 14 and toward the cable guides 54. The guides 54 are formed by projections which have a hole passing therethrough. After passing through the guides 54 the cables 48 extend to and are attached to a collar 56. If the cables 48 were made of a single continuous piece of cable, then that single continuous piece of cable would simply be routed through a through hole in the collar 56.

The length of cable extending between the fin-like projections 50 and the guides 54, is covered by flexible but incompressible sheaths 58. The cables 48 and the sheaths 58 are similar in structure and function to the cables and sheaths used to operate bicycle brakes. The sheaths 58 are larger in diameter, at least at the ends, than the holes in the fin-like projections 50 and the guides 54 such that the sheaths 58 will not pass through those holes. This property of the sheaths 58, that they not pass through the holes in the fin-like projections 50 and the guides 54, can be obtained either by having the sheath 58 itself be of larger diameter than the aforementioned holes, or by providing collars that have diameters larger than the diameters of the aforementioned holes and that are crimped or otherwise fixed to the ends of the sheaths 58.

The ends of the sheaths 58 may directly abut the fin-like projections 50 and the guides 54. Alternatively, externally threaded collars (not shown) that allow the cables 48 but not the sheaths 58 to pass therethrough, may be provided at either the holes in the fin-like projections 50 or the holes in the guides 54. These externally threaded collars either threadably engage the holes in the fin-like projections 50 and the guides 54, or they threadably engage collars (not shown) which abut the fin-like projections 50 and the guides 54. Turning the externally threaded collars varies the length of the portion of the externally threaded collars extending between the ends of the sheaths 58 and either the fin-like projections 50 or the guides 54 as the case may be. Thus these externally threaded collars can be used to adjust the length of the portion of the cables 48 which extend between the fin-like projections. 50 and the guides 54. This alternative arrangement allows the tension in the cables 48 to be adjusted to take up all slack in the cables 48 such that they remain taught at all times. These externally threaded collars are identical to the well known, tension adjustments used in bicycle brake systems and are therefore not shown in the illustrations.

The sheaths 58 fix the length of the portion of the cables 48 which extend between the fin-like projections 50 and the guides 54 at any given time. Thus when the ends of the cables 48 attached to the collar 56 are pulled, the ends of the cables 48 attached to the extensions 46 will also be pulled causing the latches 32 to move toward the open position. Movement of the latches 32 to the open position will allow the clamps 18 to spring open if they were initially in the closed configuration.

The collar 56 is fixedly supported along the length of a pivoting lever 60. One end 62 of the lever 60 is pivotally supported by a pair of flat, rectangular projections 64. The projections 64 are spaced apart from one another and are provided at about the middle of the supporting member 14. The other end of the lever 60 is provided with a spherical knob 66 for ease of grasping. The lever 60 is movable between a closed position, illustrated in FIG. 2, and an open position illustrated in FIG. 1. In the closed position the collar 56 is located closest to the guides 54 such that a sufficient length of the cable 48 extends between the fin-like projections 50 and the extensions 46 for the latches 32 to be in the closed position. Pivoting the lever 60 toward the open position will cause the collar 56 to move away from the guides 54 causing the cables 48 to be pulled. This pulling of the cables 48 causes the latches 32 to pivot toward the open position. Thus, moving the lever 60 from the closed to the open position will cause the latches 32 to move from the closed to the open position, thereby allowing the clamps 18 to spring open if they were initially in the closed configuration.

Extending from the bottom of the supporting member 14, i.e. the side of the supporting member 14 opposite the side from which the projections 64 extend, is an attachment member 68. This attachment member 68 extends roughly perpendicularly from the supporting member 14, and may be made of the same square cross section tubing as the supporting member 14. The attachment member 68 is inserted into an adapter 70 which is securely attached to a vehicle. The attachment member 68 is secured to the adapter 70 by a bolt (not shown) which threadably engages a hole in the adapter 70 and frictionally engages the attachment member 68 when tightened, after the attachment member 68 has been inserted into the adapter 70.

With the clamps 18 initially in the open position, the bow 12 can be positioned on the jaws 24 such that each of the jaws 24 cradles one of the limbs of the bow. The jaws 26 are then moved toward the closed position until the jaws 26 encounter the outer bevelled surfaces 44 of the latches 32. Because of the bevelled surfaces 44, continued pressure on the jaws 26 will move the latches 32 out of the way allowing the laws 26 to move into the closed position. At this time the ridges 42 will automatically snap over the jaws 26 to secure the jaws 26 in the closed position. If the amount of pressure on jaws 26 required to move the latches 32 out of the way during the closing of the clamps 18 is excessive, then the latches 32 may have to be moved manually in order to allow the jaws 26 to be locked in place. The limbs of the bow 12 are now securely gripped in the clamps 18, thus immobilizing the bow within or on the vehicle carrying the bow. Padding 72 allows the limbs of the bow to be gripped firmly without the limbs of the bow being nicked or scratched.

To release the bow, the lever 60 is pulled up moving the lever from the closed position to the open position. The moving of the lever 60 will cause the cables 48 to be pulled, which in turn causes the latches 32 to be moved to the open position. Under these conditions, the jaws 26 will spring open under the impetus of the torsion springs 40. Regardless of whether or not the lever 60 is released subsequent to the jaws 26 springing open, the bow 12 is now free to be readily removed from the clamps 18.

Note that although torsion springs 40 are used in the illustrated example, the clamps 18 will still be operable in the absence of the torsion springs 40. For example, the padding 72 may be under sufficient compression to cause the jaws 26 to spring open, or the jaws 26 may be opened manually.

The tilt angle of each clamp 18, i.e. the angle of rotation of the clamps 18 about the longitudinal axis of their respective stems 20, may be the fixed such that the plates 28 of the jaws 24 will be tangent to the curving limbs of the bow 12. Alternatively, the clamps 18 may be free to rotate about the longitudinal axis of their respective stems 20, and naturally assume the correct tilt angle as they are closed around the limbs of the archery bow 12. The following discussion provides some examples of the ways in which the clamps 18 can be attached to the stems 20.

Figure 5:
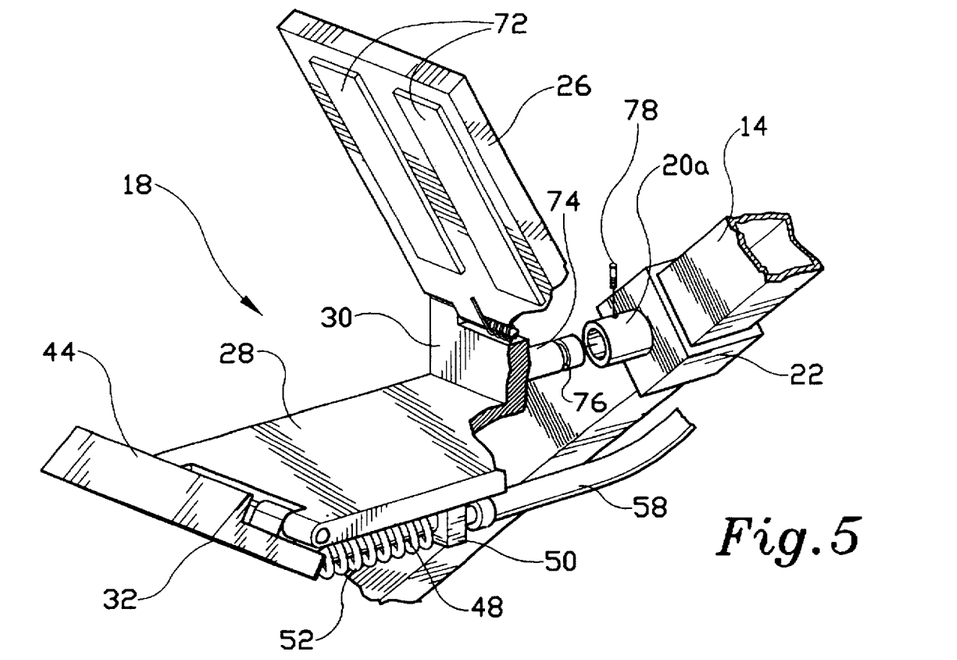
FIG. 5 is a fragmentary detail view showing the structure for the attachment of the clamps to the supporting member in the first embodiment of the quick release bow rack of the present invention.

Referring to FIG. 5, the plate 30 has a shaft 74 projecting from the back thereof. The stem 20a is fixed to collar 22, and is hollow so as to receive the shaft 74. The shaft 74 has a circumferential groove 76 that registers with a threaded hole in the stem 20a. A screw 78 engages the threaded hole in the stem 20a and can be turned until it protrudes into the groove 76, thus securing the shaft 74 within the stem 20a. Depending on how much the screw 78 is tightened, the tilt angle of the clamp 18 may be fixed or the clamp 18 may be free to rotate about the longitudinal axis of the stem 20a.

Figure 6:
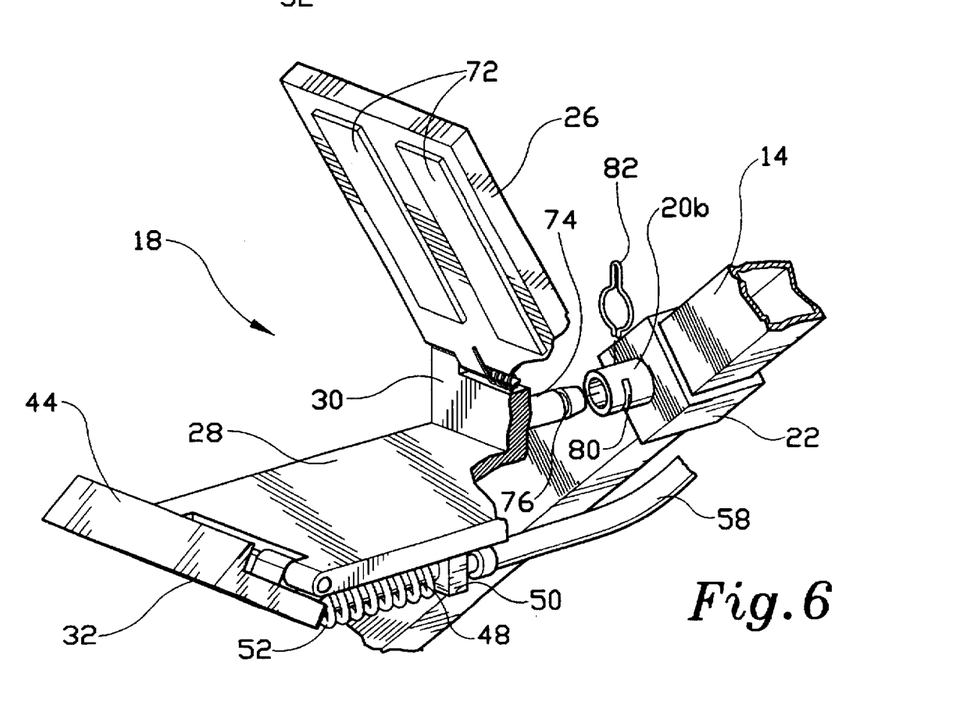
FIG. 6 is a fragmentary detail view showing the structure for the attachment of the clamps to the supporting member in the second embodiment of the quick release bow rack of the present invention.

Referring to FIG. 6, a second embodiment of the invention is seen. As before, the plate 30 has a shaft 74 projecting from the back thereof. The stem 20b is fixed to collar 22, and is hollow so as to receive the shaft 74. The shaft 74 has a circumferential groove 76 that registers with slots 80 formed on either side in the wall of the stem 20b. A spring clip 82 snaps around the stem 20b, portions of its two arms passing through the slots 80 and protruding into the groove 76, thus securing the shaft 74 within the stem 20b. In this embodiment the clamp 18 will be free to rotate about the longitudinal axis of the stem 20b.

Figure 7:
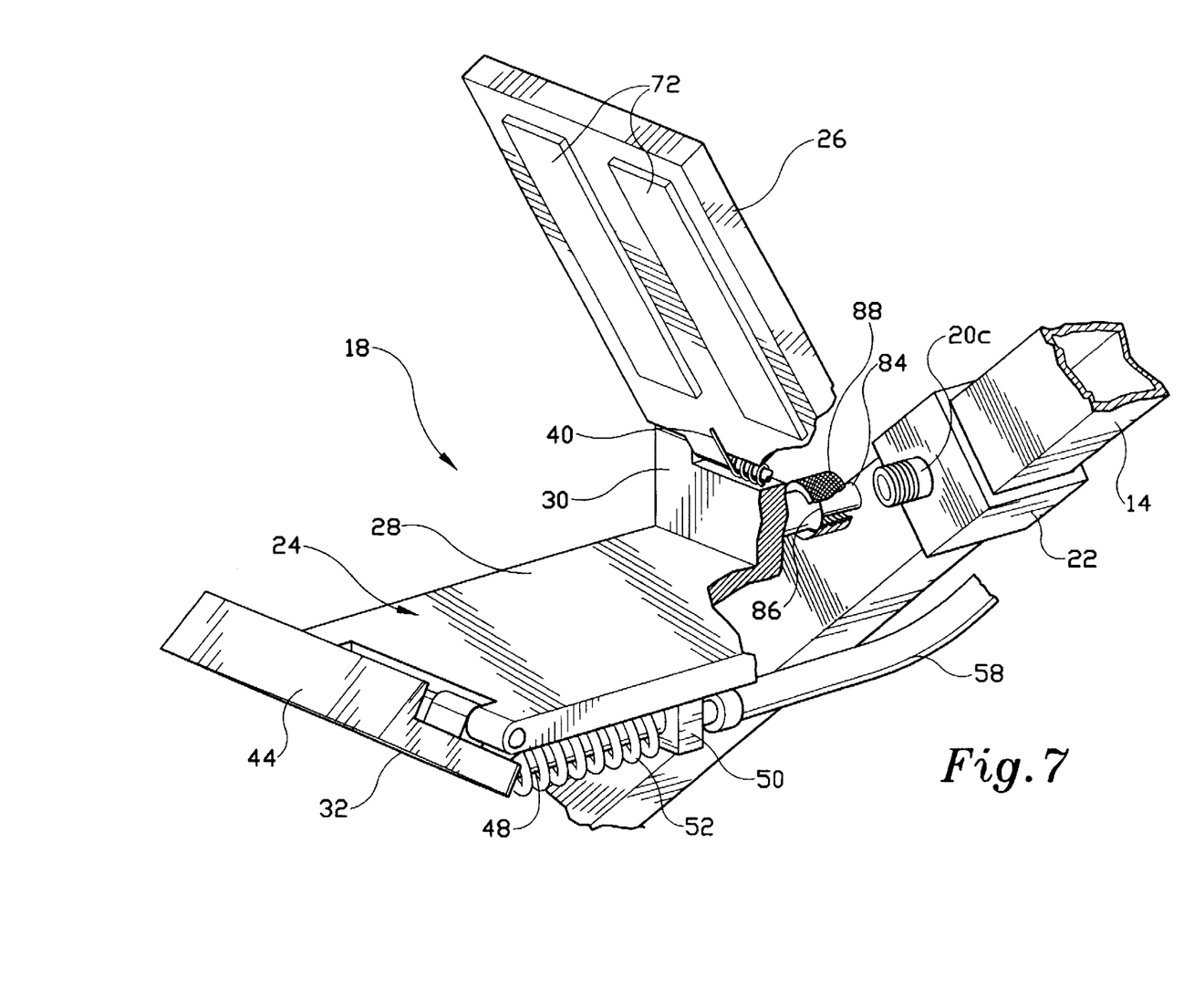
FIG. 7 is a fragmentary detail view showing the structure for the attachment of the clamps to the supporting member in the third embodiment of the quick release bow rack of the present invention.

Referring to FIG. 7, a third embodiment of the invention is seen. The plate 30 has a shaft 84 projecting from the back thereof. The shaft 84 has a flange 86. The stem 20c is externally threaded and is fixed to collar 22. Further, The stem 20c is hollow such that the shaft 84 can be inserted therein until the flange 86 abuts the stem 20c. A collar 88 secures the clamp 18 to the stem 20c. The collar 88 is generally cylindrical with an internal bore. One end of the collar 88 has an opening of the same diameter as the internal bore, while the other end of the collar 88 has an opening with a smaller diameter. The diameter of the larger opening of the collar 88 is large enough for the flange 86 to pass therethrough unimpeded, while the diameter of the smaller opening of the collar 88 is smaller than the outer diameter of the flange 86 thereby preventing the flange 86 from passing through the smaller opening. The internal bore of the collar 88 is threaded, and the sizes of the bore and the larger opening of the collar 88 are such that the collar 88 can engage the external threads on the stem 20c. The end of the collar 88 with the smaller opening is positioned between the plate 30 and the flange 86. When the collar 88 is threadably engaged to the stem 20c the flange 86 is confined between the end of the collar 88 with the smaller opening and the open end of the stem 20c, thus securing the clamp 18 to the stem 20c. Depending on how tightly the collar 88 is screwed on to the stem 20c, the tilt angle of the clamp 18 may be fixed or the clamp 18 may be free to -rotate about the longitudinal axis of the stem 20c.

Figure 8:
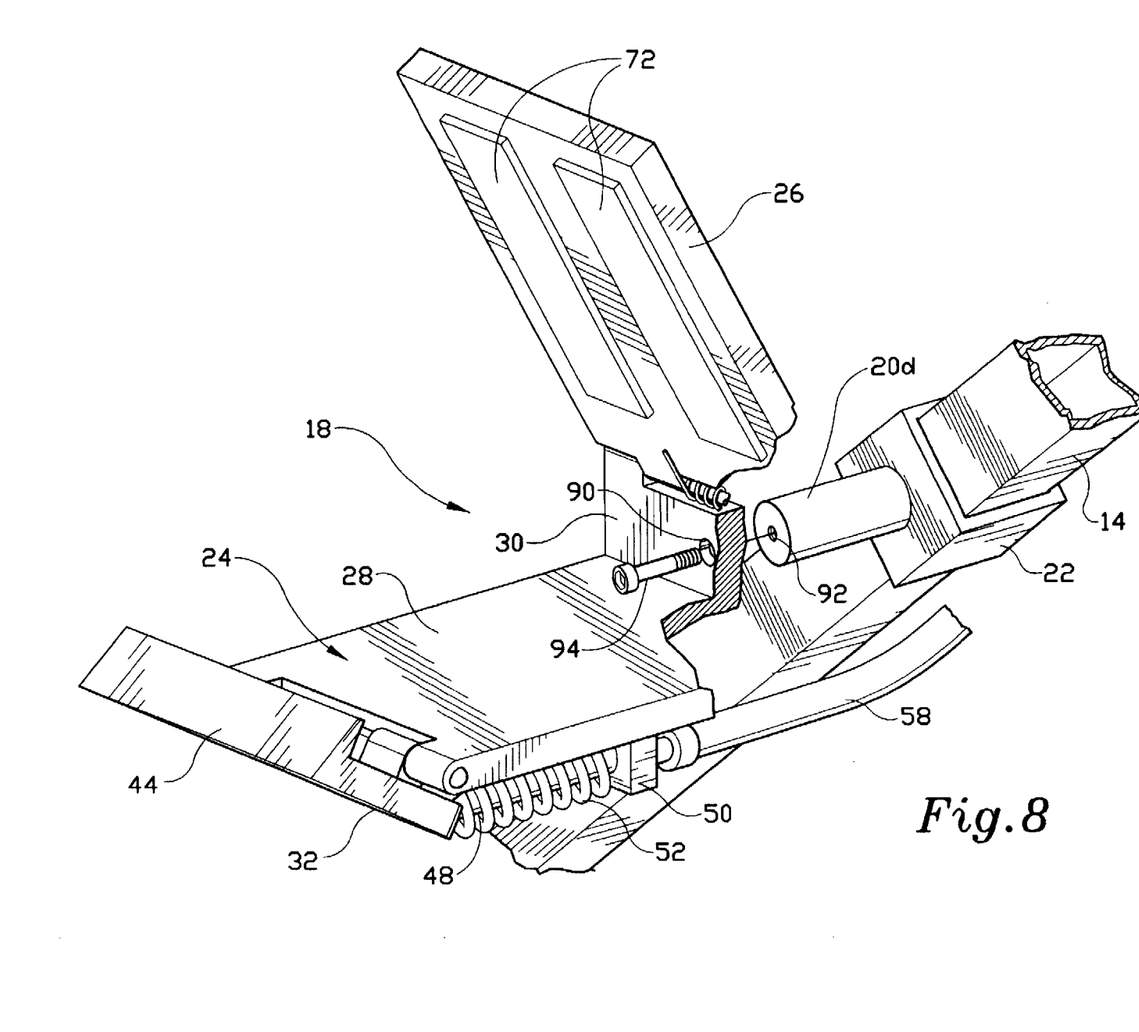
FIG. 8 is a fragmentary detail view showing the structure for the attachment of the clamps to the supporting member in the fourth embodiment of the quick release bow rack of the present invention.

Referring to FIG. 8, the plate 30 has a counter sunk hole 90 passing roughly centrally therethrough. The stem 20d is fixed to collar 22 at one end, and has a threaded hole 92 in the other end thereof. A screw 94, in this example an allen head screw, passes through the hole 90 and engages the threaded hole 92 to secure the clamp 18 to the stem 20d. The hole 90, with the exception of the counter sunk portion, is smaller in diameter than the head of the screw 94. Thus when the screw 94 is engaged to the threaded hole 92, the plate 30 is confined between the head of the screw 94 and the stem 20d securing the clamp 18 to the stem 20d. The counter sunk portion of the hole 90 is intended to accommodate the head of the screw 94, so that the head of the screw 94 will not interfere with the limbs of the bow 12 when the limbs of the bow are placed on the jaws 24. Depending on how much the screw 94 is tightened, the tilt angle of the clamp 18 may be fixed or the clamp 18 may be free to rotate about the longitudinal axis of the stem 20d.

Figure 9:
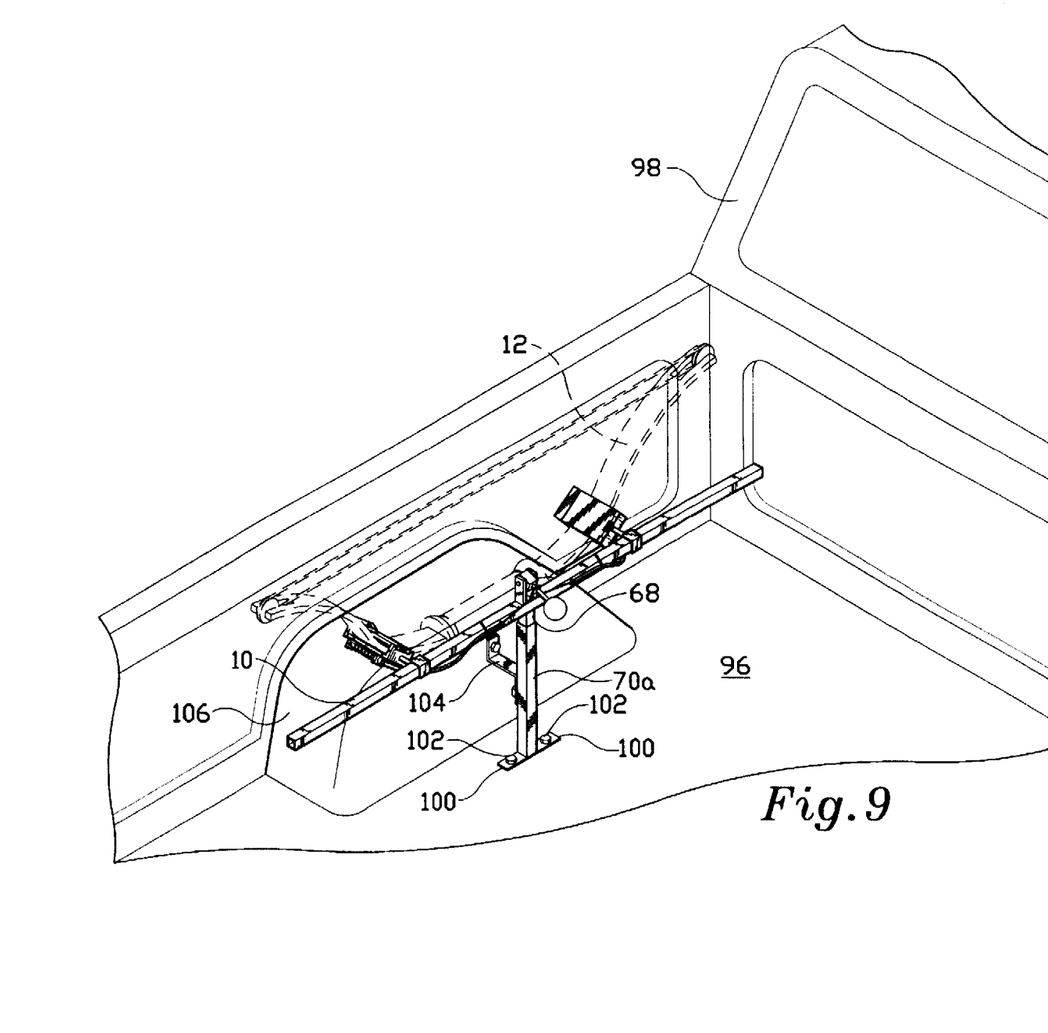
FIG. 9 is an environmental perspective view showing the quick release bow rack of the present invention installed in the bed of a pickup truck.
Figure 10:
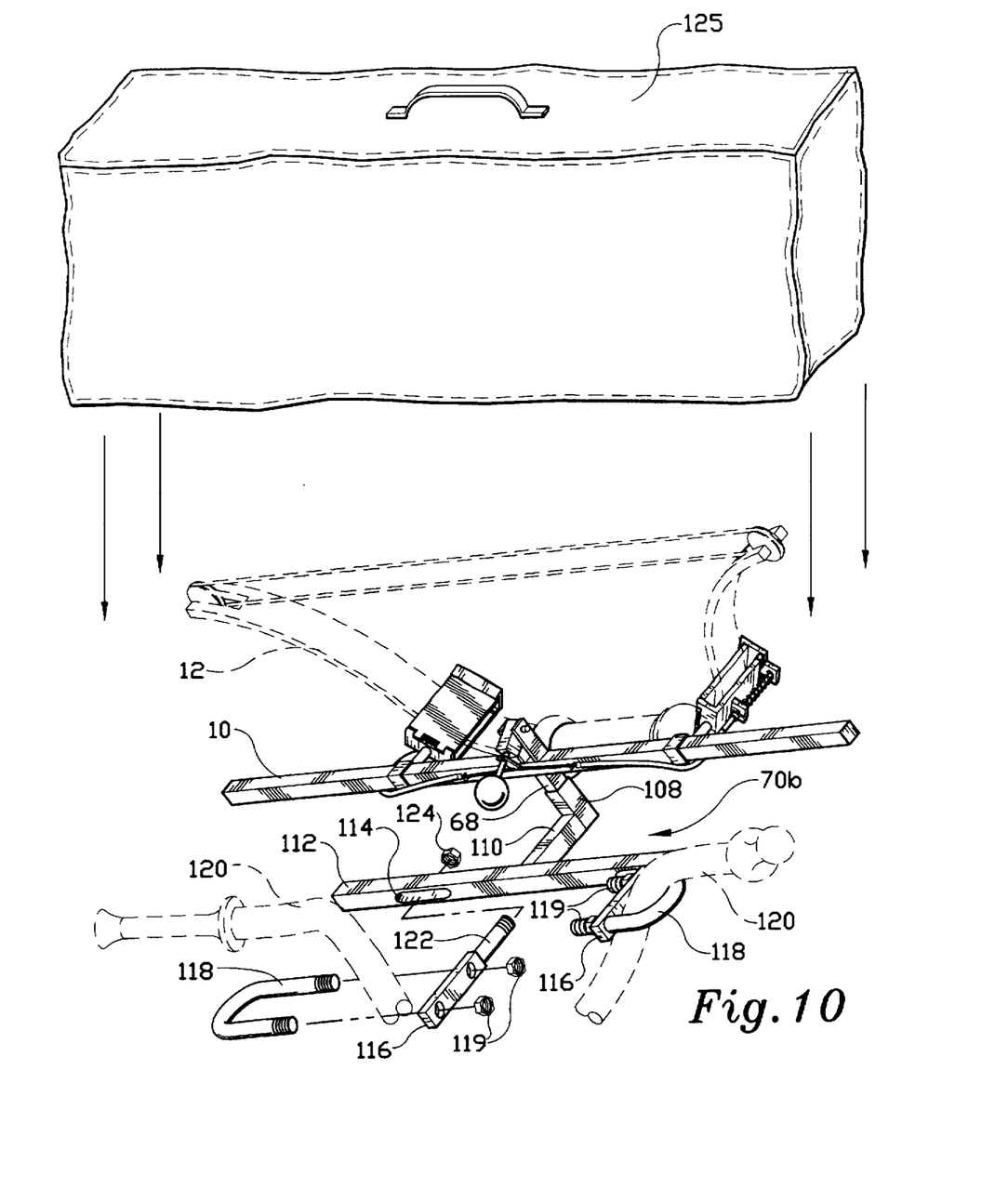
FIG. 10 is an environmental perspective view showing the quick release bow rack of the present invention installed on an all terrain vehicle.
Figure 11:
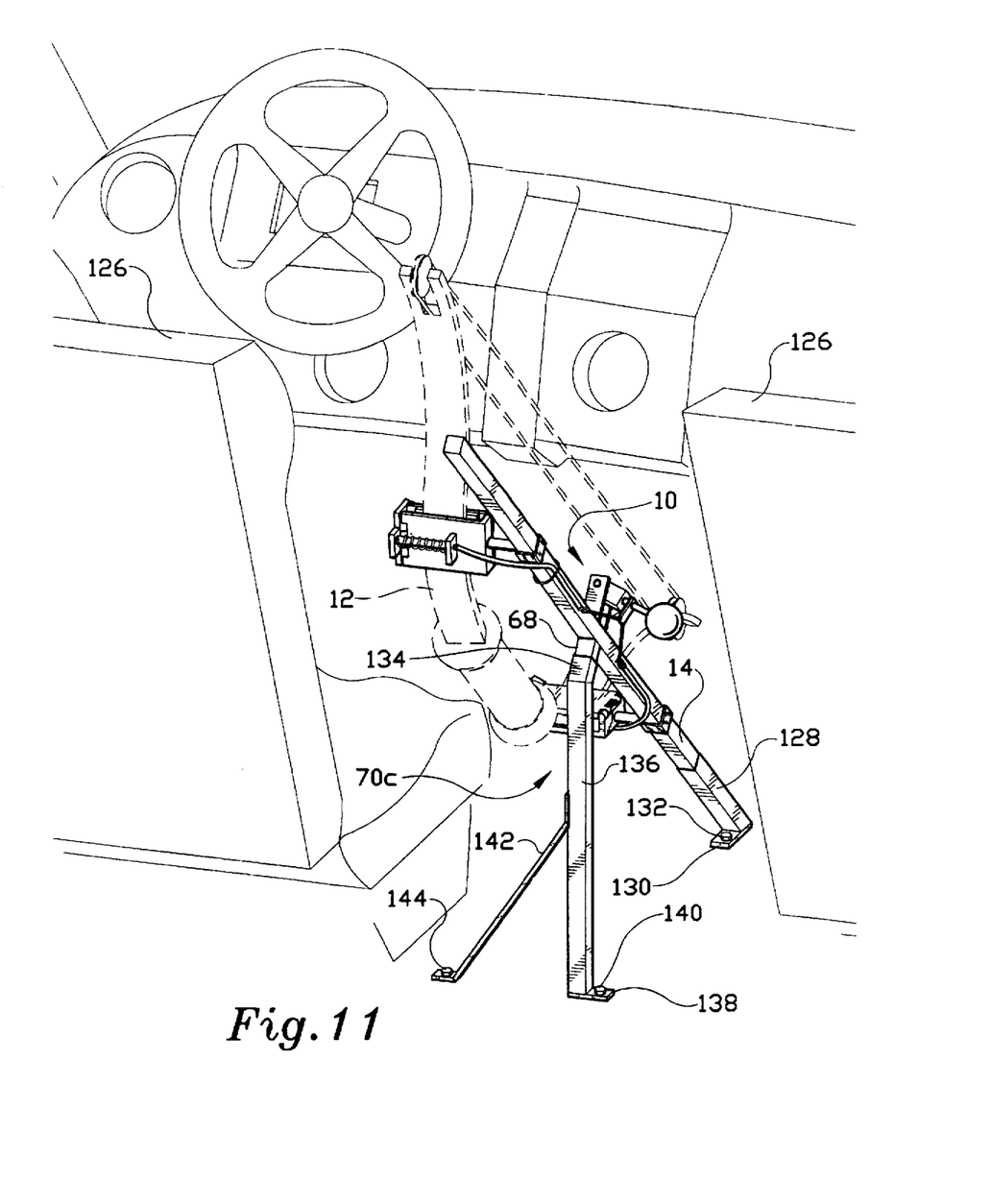
FIG. 11 is an environmental perspective view showing the quick release bow rack of the present invention installed in the passenger compartment of a sport utility vehicle.

Referring to FIGS. 9–11, various adapters for fixing the bow rack 10 to various vehicles can be seen. Referring to FIG. 9, the bow rack 10 is shown mounted on the bed 96 of a pickup truck 98. The mounting of the bow rack 10 to the pickup truck bed 96 is accomplished using an adapter 70a which is basically a length of hollow square cross section tubing of sufficient size for the attachment member 68 to fit in. As stated previously, the attachment member 68 is secured to the adapter 70a by a bolt (not shown) which threadably engages a hole in the adapter 70a and frictionally engages the attachment member 68 when tightened, of course with the attachment member 68 being inserted into the adapter 70a. There are two base plates 100 provided at the bottom of the adapter 70a. The base plates 100 have holes therein to allow the passage of the shafts of the bolts 102 therethrough. The bolts 102 are used to secure the adapter 70a to the truck bed 96. A brace 104 bolted between the wheel well 106 and the adapter 70a, gives added rigidity to the whole mounting arrangement for the bow rack 10.

Referring to FIG. 10, the adapter 70b for mounting the bow rack 10 to and all terrain vehicle (ATV) can be seen. The adapter 70b includes a tubular receiver 108 which receives the attachment member 68. As before the attachment member 68 is secured to the receiver 108 by a bolt (not shown) which threadably engages a hole in the receiver 108 and frictionally engages the attachment member 68 positioned in the receiver 108. A length of tubing 110, extending perpendicularly from the receiver 108, rigidly connects the receiver 108 to a base bar 112. The tubing 110 attaches to the base bar 112 at about the middle of the base bar, and the tubing 110 is also perpendicular to the base bar 112. The base bar 112 has two slots 114 symmetrically distributed relative to the middle of the base bar 112. Attachment brackets 116 are secured to the ATV handle bars 120 using U-bolts 118 and nuts 119. The attachment brackets 116 have portions 122 which fit through the slots 114. Nuts 124, in cooperation with the attachment brackets 116, frictionally secure the attachment brackets 116 to the base bar 112. The slots 114 allow the adapter 70b to fit handle bars of various sizes. Protective cover 125, made of leather or vinyl, protects the bow 12 from the elements.

Referring to FIG. 11, an adapter 70c for mounting the bow rack 10 in the passenger compartment of a vehicle between the front seats 126, can be seen. The adapter 70c includes two pieces. The first piece includes a length of tubing 128 which is sized to receive one end of the supporting member 14. The tubing 128 has a base plate 130 at the bottom thereof, which is angled relative to the longitudinal axis of the tubing 128 such that the tubing 128 projects at an acute angle from the floor board of the vehicle when the base plate 130 is bolted to the floor board using bolt 132.

The second piece of the adapter 70c includes a receiver 134 for receiving the attachment member 68. A length of tubing 136 supports the receiver 134 above the floor board of the vehicle. The tubing 136 is angled relative to the receiver 134, such that the tubing 136 can extend perpendicularly to the floor board while the receiver 134 is coaxial with the attachment member 68. A base plate 138, provided at the bottom of the tubing 136, allows the tubing 136 to be bolted to the floor board of the vehicle using the bolt 140. A brace 142 extends at an angle between the tubing 136 and the floor board of the vehicle for added support. A bolt 144 secures the bottom end of the brace 142 to the floor board of the vehicle. Note that no bolts are needed to secure the attachment member 68 or the end of the supporting member 14 to the respective pieces of the adapter 70c, because the two pieces of the adapter 70c geometrically confine the bow rack 10.

It should also be noted that, rather than frictionally engaging the attachment member 68, the bolt securing the attachment member 68 to the various adapters, may engage a hole provided in the attachment member 68.

Figure 12:
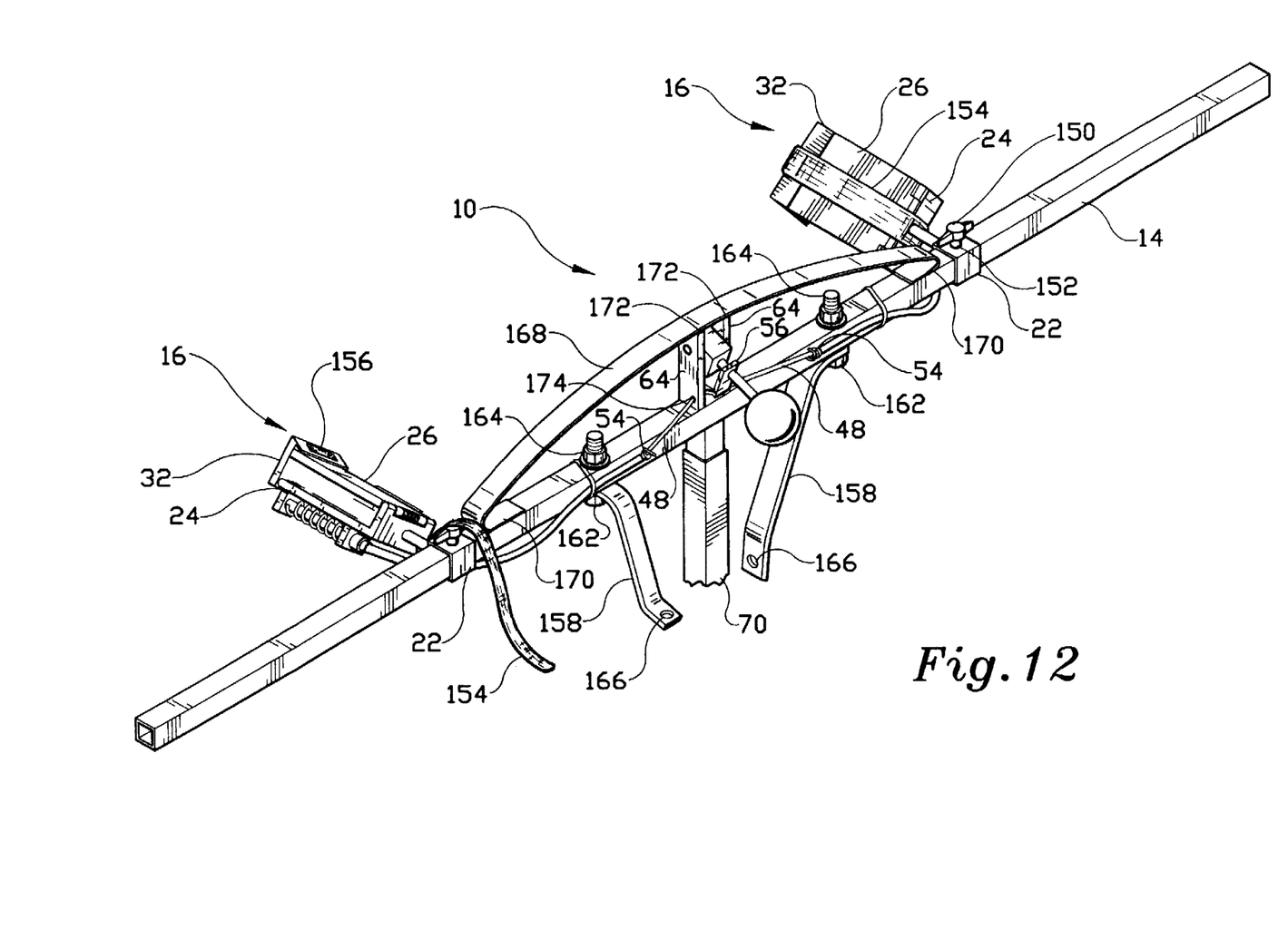
FIG. 12 is a front perspective view of an alternate embodiment of the quick release bow rack of the present invention.

Referring to FIG. 12, a safety strap 154 may be affixed to jaw 24 such that it may extend over jaw 26 and connect to latch 32. The strap 154 is constructed of nylon, although any other similar material may be used, and has a hook and loop fastener attached to its distal end. A hook and loop fastener is affixed to the latch 32 such that the strap 154 may be quickly attached to and detached from the latch 32, thereby ensuring that the latch will remain in the closed position.

FIG. 12 also shows plastic thumb screws 150 which engage threaded holes 152 in the collars 22 and which frictionally engage the supporting member 14 when tightened. Once the clamp assemblies 16 are moved to the desired locations along the supporting member 14, the collars 22 and thus the clamp assemblies 16 are securely held at the desired locations by the thumb screws 150.

A pair of bottom support brackets 158 are each attached to the supporting member 14 by a bolt 162 and nut 164. The bottom support brackets 158 extend at an angle between the supporting member 14 and the adapter 70. The bottom support brackets 158 give the supporting member 14 more rigidity upon the adapter 70. Bolts may be used through holes 166 in the bottom support brackets 158 and through a hole (not shown) in the adapter 70. Additionally, a top support brace 168 is attached on either end to the supporting member 14 at 170. The top support brace 168 is affixed to the top edge of the flat, rectangular projections 64, by welding at 172 or other conventional method, in order to ensure the projections 64 remain stabile.

In FIG. 12 the cables 48 extend through holes 174 in the base of the rectangular projections 64 and are attached to a collar 56 in the same manner as described above. By directing the cable 48 in this manner, the collar does not need to travel as far as before in order to move the latch 32 the same amount of distance. In addition, not as much strain is placed on the cable guides 54, thereby reducing frictional forces between the cable 48 and the cable guides 54 and reducing the likelihood of long-term wear and eventual failure of the various parts.

It is to be understood that the present invention is not limited to the embodiments described above, but encompasses any and all embodiments within the scope of the following claims.

I claim:

1. A quick release bow rack comprising:
    a supporting member having a first end portion, and a second end portion;
    a first clamp for clamping a bow, said first clamp connected to said first end portion of said supporting member;
    a second clamp for clamping a bow, said second clamp connected to said second end portion of said supporting member;
    said first and said second clamp each including,
        a first jaw having a first end and a distal second end, said first end connected to said supporting member,
        a second jaw pivotally connected to said first end of said first jaw, and
        a latch pivotally connected to said second end of said first jaw, said latch for holding said second jaw in a closed position; and
    actuating means for simultaneously releasing each latch of said first clamp and said second clamp from the closed position to an open position, said actuating means connected to said supporting member.

2. The quick release bow rack according to claim 1, wherein said first clamp and said second clamp are biased towards said open position.

3. The quick release bow rack according to claim 1, wherein said first clamp and said second clamp are slidably connected to said supporting member, whereby said first and said second clamp are positionable at any desired location along said supporting member.

4. The quick release bow rack according to claim 1, wherein said first clamp and said second clamp are pivotally connected to said supporting member.

5. The quick release bow rack according to claim 1, wherein said second jaw is biased towards said open position.

6. The quick release bow rack according to claim 1, wherein said first and said second jaws have cushioning thereon.

7. The quick release bow rack according to claim 1, wherein said first clamp and said second clamp include means for preventing said latch from releasing said second jaw from said closed position.

8. The quick release bow rack according to claim 7, wherein said means for preventing said latch from releasing said second jaw from said closed position comprise:
    a strap having a first end and a second end, said first end being attached to said first jaw; and
    a hook and loop fastener connecting said second end of said strap to said latch, whereby said latch is prevented from releasing said second jaw from said closed position.

9. The quick release bow rack according to claim 1, wherein said actuating means comprise:
    a lever pivotally attached to said supporting member, said lever being movable between a first position and a second position; and a wire operably connecting said lever to said latches of said first clamp and said second clamp, whereby when said lever is in said first position, said latches of said first clamp and said second clamp are in said closed position, and when said lever is in said second position, said latches of said first clamp and said second clamp are in said open position.

10. The quick release bow rack according to claim 9, wherein said latch of each said first clamp and said second clamp are biased towards said closed position.

11. The quick release bow rack according to claim 1, further comprising mounting means for mounting said bow rack to a vehicle.

12. The quick release bow rack according to claim 11, wherein said mounting means comprise:

an adapter disposed for mounting to the vehicle, said adapter having a receiving portion; and an attachment member projecting from said supporting member, said attachment member being attached to said receiving portion of said adapter.

13. The quick release bow rack according to claim 12, wherein said adapter further comprises:

a beam having a first end portion and a second end portion, said receiving portion being attached to said beam;

a first element slidably connected to said first end of said beam;

a first U-shaped member detachably connected to said first element, said first U-shaped member and said first element defining a first enclosed orifice;

a second element slidably connected to said second end of said beam; and a second U-shaped member detachably connected to said second element, said second U-shaped member and said second element defining a second enclosed orifice.

* * * * *